US008015596B2

(12) United States Patent
Wray

(10) Patent No.: US 8,015,596 B2
(45) Date of Patent: Sep. 6, 2011

(54) SHARED CREDENTIAL STORE

(75) Inventor: John C. Wray, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 720 days.

(21) Appl. No.: 10/878,166

(22) Filed: Jun. 28, 2004

(65) Prior Publication Data

US 2005/0289644 A1 Dec. 29, 2005

(51) Int. Cl.
*G06F 7/04* (2006.01)
(52) U.S. Cl. .............................................. 726/5; 726/6
(58) Field of Classification Search .............. 726/2, 5–6, 726/18; 713/155, 168–181; 380/247
See application file for complete search history.

(56) References Cited

U.S. PATENT DOCUMENTS

| 7,191,447 | B1* | 3/2007 | Ellis et al. | 719/310 |
| 2002/0116647 | A1* | 8/2002 | Mont et al. | 713/201 |
| 2004/0162786 | A1* | 8/2004 | Cross et al. | 705/59 |
| 2005/0171872 | A1* | 8/2005 | Burch et al. | 705/29 |
| 2005/0257072 | A1* | 11/2005 | Cross et al. | 713/193 |

* cited by examiner

*Primary Examiner* — Beemnet W Dada
*Assistant Examiner* — Suman Debnath
(74) *Attorney, Agent, or Firm* — David A. Dagg

(57) ABSTRACT

A personal credential store that aggregates a number of physical credential stores beneath an application programming interface (API) and offers tag-based credential look-up. The API of the disclosed system runs on the user's client system, and effectively hides the underlying credential store types from applications using it. The tags used to look up credentials through the API may advantageously include or consist of unique identifiers indicating the functional purpose of the desired credential. The types of physical credential store aggregated together under the disclosed API may include a local credential store, a network-resident private credential store that may be shared across multiple client systems operated by a single user, and a network-resident shareable credential store, that may be used by processes acting on behalf of the user, and/or shared by multiple users.

26 Claims, 2 Drawing Sheets

SHARED CREDENTIAL STORE

FIELD OF THE INVENTION

The present invention relates generally to network computing, security, access authorization, and encryption, and more specifically to a method and system for providing a shared credential store.

BACKGROUND OF THE INVENTION

As it is generally known in networked computer systems, electronic "credentials" are data objects used in many situations for identification and/or authorization purposes. A network user may have to store and/or access various different credentials. Credentials may fall into the following categories: 1) user credentials, and 2) third party credentials. User credentials are used to prove a user's identity to remote systems. Usernames, passwords, and private keys are examples of user credentials. Third party credentials enable a user or client system to authenticate remote systems. Examples of a third party credential include public key certificates.

There are multiple accessibility requirements and restrictions for an effective credential store. Some credentials should be accessible from a variety of locations, since a user may use multiple client systems, and processes acting on the user's behalf may include programs running either on the user's client system, or on a remote server system. Additionally, credential data should be available to the user's client systems even when they are disconnected from the network. Furthermore, some sensitive credential data, such as private keys used for signing digital signatures, must be kept tightly controlled, never leaving the user's client system.

To conveniently make use of credentials, applications should be able to locate them by intended purpose. For example, when sending electronic mail ("email"), an email application needs to be able to locate the user's default signing credential, or any signing credential for a signature algorithm supported by the intended recipient. When receiving a digitally signed email message, the email application needs to determine whether the user has indicated that he trusts the certificate used to sign the received message. This leads to a requirement that applications be provided with a way to effectively search for credentials, based on the purpose for which the credentials are needed or other properties, some of which can be assigned to credentials by the user.

With regard to credential management, system administrators need to be able to specify a set of certificates that should be trusted by users whom they manage, for use in protocols such as SSL (Secure Sockets Layer) and/or S/MIME (Secure Multi-purpose Internet Mail Extensions). This type of requirement leads to a need for an administrator to be able to conveniently modify some subset of a user's credentials.

Also, some credentials, while owned by the user and considered sensitive enough to be held on the user's client machine and never released to network processes, must still be managed centrally. A user's document signing credential is an example of such a credential. The private component of the credential is extremely sensitive, and should be closely held by the user. However, the public component of the credential must be certified by a trusted third-party certificate authority, and the resulting certificate, once issued, must be re-united with the appropriate private key. In a managed environment, this process of certification and re-uniting of certificate with private key should happen without need for the user's direct interaction. This calls for an administrative process to be able to update the credential on the user's client system, in order to add the certificate to it.

Prior credential storage solutions have failed to completely and effectively address these requirements. The .NET "Passport" system provided by Microsoft® stores credential and other data on a central server for users, and uses HTTP (HyperText Transport Protocol) authentication to unlock a passport object, and to make its contents available to browser-resident code. The passports are single-user objects, and cannot be shared between users. The contents of the passport is visible to the passport server, to avoid the need for re-authenticate on every credential request, and because the passport server encrypts credentials directly for target servers rather than returning them to the client. Passport objects are not replicated to any client system, and the passport system fails to provide local credential stores, nor private network credential stores. Accordingly, the Passport system creates a single point of failure/compromise, and lacks significant desirable functionality.

The IBM® Websphere Portal Credential Vault advantageously lets users store credentials persistently. The services of this system have been limited to portlets running on a single cluster. The credential vault is available to only to server processes acting for browser clients. Client system local, and network-resident private credential stores are not provided.

The Notes ID-file in IBM® Lotus® Notes provides a local credential store, as well as roaming user support. However, the Notes ID-file offers no effective aggregation interface for multiple credential stores, or a trust policy, since it does not deal with multiple shared credential stores.

In the RSA Keon® Web Passport system, software creates an explicit "virtual smart card" on the client system, in order to avoid the use of browser features like cookies to maintain security context. However, this virtual smart card is a transient object, and does not serve as a persistent local copy of any network-resident store.

Accordingly, for the reasons stated above and others, and in view of the shortcomings of previous solutions, it would be desirable to have a new system for storing credentials that aggregates access to a variety of credential stores. The new system should allow credentials to be conveniently retrieved from the aggregated stores based on the purpose for which the credentials are needed, and/or other properties, and allow system administrators convenient access to certain types of credentials, and to portions of credentials that are otherwise kept private to the user's client system.

SUMMARY OF THE INVENTION

To address the above described and other shortcomings of existing systems, a personal credential store is disclosed which aggregates a number of physical credential stores beneath an application programming interface (API) that offers tag-based credential look-up. The API of the disclosed system runs on the user's client system, and effectively hides the underlying credential store types from applications using it. The tags used to look up credentials through the API may advantageously include or consist of unique identifiers indicating the functional purpose of the desired credential.

The types of physical credential store aggregated together under the disclosed API may include the following:

1) A Local Credential Store, which may be implemented as a password-encrypted local file, resident on the user's client system. The Local Credential Store is used to contain highly sensitive credentials that need not be available to other systems.

2) A Network-resident Private Credential Store that may be shared across multiple client systems operated by a single user. Each Network-resident Private Credential Store may be password-encrypted, and protected by the server system that hosts it from password-guessing attacks. A pre-authentication mechanism, such as an encrypted key exchange ("EKE") technique, may be employed to prevent the host server from having access to plaintext user credentials.

3) A Network-resident Shareable Credential Store, that may be used by processes acting on behalf of the user that do not know the user's password, such as scheduled agents or background tasks, or which may be shared by multiple users, for example by storing administrator-defined root certificates. Shareable Credential Stores may use ACLs (access control lists) or the equivalent to control access. A trust policy, implemented by the disclosed system, determines whether an open store is presented via the disclosed aggregate API.

Only content from trusted stores is made available through the aggregate API. In one embodiment, un-trusted stores may be opened, but their content is only made available if the store is explicitly addressed through an API external to the disclosed aggregate API, and associated with the un-trusted store. Accordingly, such un-trusted stores may be invisible to most applications.

The disclosed system further enables an administrator to centrally-manage portions of otherwise private credentials, such as a set of root certificates that client applications will trust for SSL, S/MIME and other purposes.

The network credential stores are replicated in local copies on the client system, which may be periodically updated. Changes to the client copies of the network credential stores are written back to their host network servers in order to keep the network resident copies up to date.

Thus there is disclosed a new system for storing credentials that aggregates access to a various types of credential stores. The new system allows credentials to be conveniently retrieved from the aggregated stores based on the purpose for which the credentials are needed, and/or other properties, and allows system administrators convenient access to certain types of credentials, and to portions of credentials that are otherwise kept private to the user's client system.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
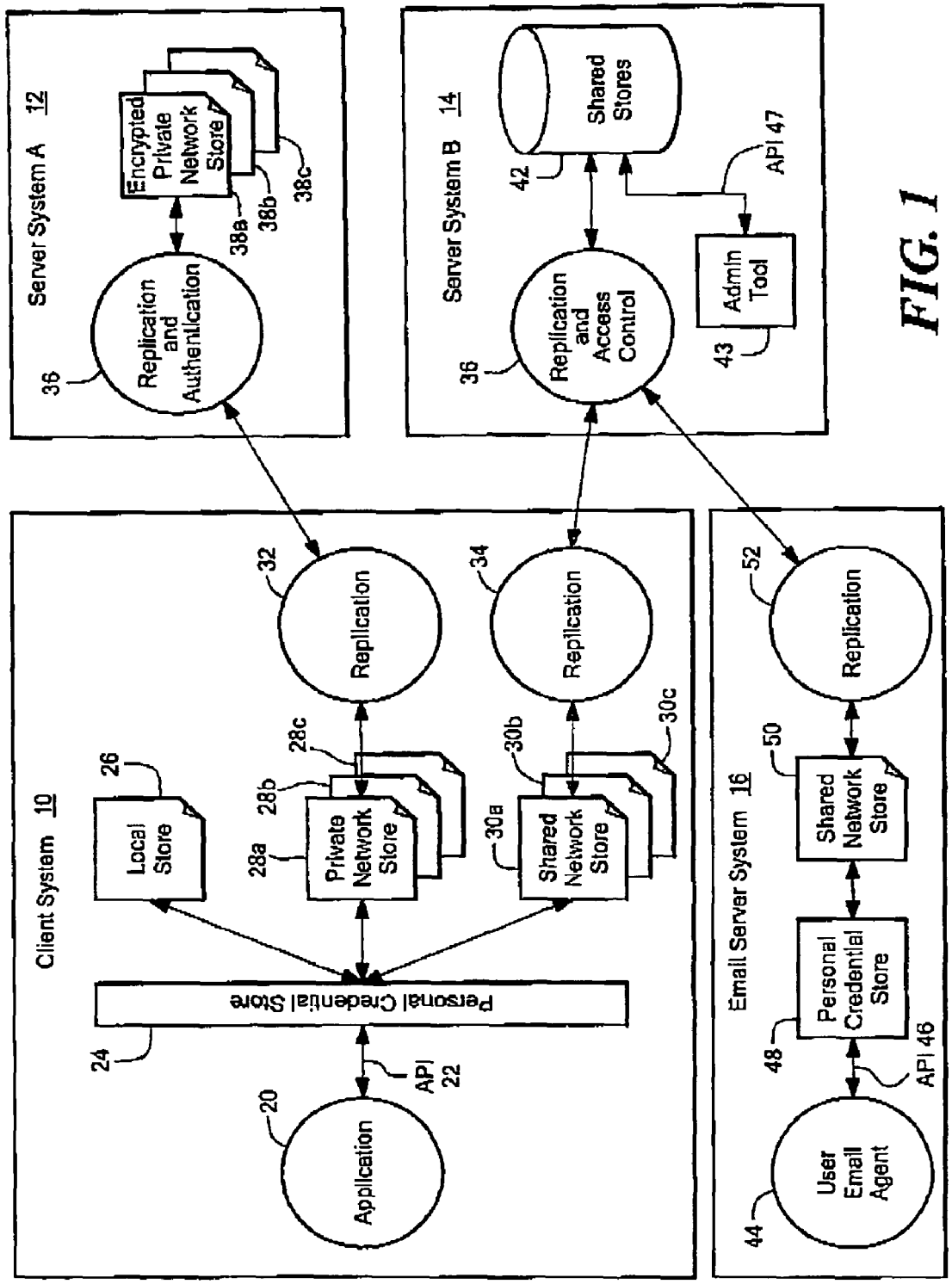
FIG. 1 is a block diagram showing an illustrative embodiment of the disclosed system.

As shown in FIG. 1, an illustrative embodiment of the disclosed system operates in an execution environment including a client system 10, a server system A 12, a server system B 14, and a mail server system 16. The client system 10 is shown including an application program 20, which communicates with an API (Application Programming Interface) 22 provided by a personal credential store process 24. The personal credential store process 24 includes software logic operable to receive search tags from the application program 20 through the API 22, and to perform searches of an aggregated set of physical credential stores. The searchable physical credential stores may, for example, including a local credential store located on the user's client computer system, as well as local copies of a number of remote credential stores. For purposes of illustration, the searchable physical credential stores are shown in FIG. 1 including a local credential store 26, as well as decrypted local copies 28a, 28b, and 28c of corresponding network resident, encrypted private credential stores 38a, 38b and 38c, stored for example on the remote server system A 12. The physical credential stores searchable by the personal credential store process 24 are further shown including, for purposes of explanation, local copies 30a, 30b and 30c of corresponding network resident, shared credential stores stored remotely in the shared stores database 42 on server system B 14. The physical credential stores that are searched by the personal credential store process 24 may be used to store user credentials for proving a user's identity to remote systems, such as usernames, passwords, and private keys, as well as third party credentials that enable authentication of remote systems, such as public key certificates ("digital certificates").

The electronic mail ("email") server 16 is shown including user email agent process 44 that communicates through API 46 with the personal credential store process 48. The personal credential store process 48 includes search logic operable to search the local copy 50 of a shared network store, replicated from the shared stores database 42 on the server system B 14.

During operation of the systems and components shown in FIG. 1, the personal credential store process 48 provides a mechanism to open multiple physical credential stores, and provides tag-based search primitives across all opened credential stores, regardless of their location. The personal credential store process 48 maintains local replicas of any network-resident stores that have been opened, and these local replicas are used as the source for credential data returned by the tag driven searches.

When the client system 10 is connected to a communications network through which the server system A 12 and server system B 14 can be reached, a replication protocol synchronizes the contents of the local replicas of the credential stores with the server-resident master versions. For example, the replication process 32 is responsible for downloading, and possibly also decrypting, the network resident, encrypted private credential stores 38a, 38b, and 38c, to be stored as the decrypted local copies 28a, 28b and 28c. To accomplish this, the replication process 32 may, for example, operate to periodically request copies of the network resident, encrypted private credential stores 38a, 38b, and 38c from the replication and authentication process 36 in server system A 12. The replication process 32 may further use a password of the user of client system 10 for decryption purposes, and provide any pre-authentication credentials that may be required by the replication and authentication process 36 as well. The replication process 32 may also be responsible for uploading sets of modifications made to, or complete modified versions of the local copies 28a, 28b, and 28c to the server system A, so that changes made by the user to those credential stores may be migrated to the network resident master copies.

The copies 30a, 30b and 30c of the shared credential stores in the shared stores database 42 are also replicated from their master copies on the server system B 14, in this case by the replication process 34 in cooperation with the replication and access control process 40 running on the servers system B. Similarly, sets of modifications made to, or complete modified versions of the local copies 30a, 30b and 30c may be uploaded to the shared credential stores database 42, thus migrating such changes to the network resident master copies.

In one embodiment of the disclosed system, the local credential store 26 is implemented as a password-encrypted XML (eXtensible Mark-up Language) file. The network-resident private credential stores 38*a*, 38*b* and 38*c* may be implemented in the same way as the local credential store 26, except that they are hosted on the server system A 12. The replication and authentication process 36 in server system A 12 pre-authenticates requests from the replication process 32 in client system 10 for credential data from the network-resident private credential stores 38*a*, 38*b* and 38*c*, using one or more conventional authentication techniques, such as the technique generally referred to as "encrypted key exchange" (EKE), in order to prevent releasing encrypted content to users who cannot demonstrate knowledge of the user's password. As it is generally known, EKE is a category of password-based authentication mechanisms that allow a client to mutually authenticate with a server using a password, resulting in the secure establishment of a shared key between client and server, without the server having to have knowledge of the actual password. Such authentication protocols may, for example, only require the server system A 12, or other systems on which the network-resident private credential stores are stored, to know a hash of the user's password.

The aggregated physical credential stores in the disclosed system meet multiple accessibility requirements and restrictions for effective credential storage. Credentials stored in the encrypted, network resident credential stores 38*a*, 38*b* and 38*c* are accessible from a variety of locations, including various locations where the client system 10 may be used, or from multiple client systems such as the client system 10. In addition, processes acting on the user's behalf may include programs running either on the user's client system, such as the application process 20, or on a remote server system, such as the user email agent process 44. Additionally, credential data from all the aggregated physical stores is available to the user's client systems even when they are disconnected from the network, since the network resident encrypted private credential stores 38*a*, 38*b*, and 38*c*, and network resident shared credential stores from the shared stores database 42 are copied locally onto the client system 10. Furthermore, the disclosed system enables some sensitive credential data, such as private keys used for signing digital signatures, to be kept tightly controlled, never leaving the user's client system 10, as stored in the local credential store 26.

In one embodiment, a number of network-resident shared credential stores, such as those from which local copies 30*a*, 30*b* and 30*c* are made, may be implemented as corresponding sets of rows in a server-maintained database, shown for example as the shared stores database 42 in server system B 14. The shared stores database 42 is fronted by a replication and access control process 40 that implements a replication protocol by which the network-resident shared credential stores in the shared stores database 42 are copied to the client system 10. Since credential lookups are performed by the personal credential store processes 24 and 48 against local copies of the physical credential stores, the replication function is the only client-access protocol exported by the shareable credential stores. Accordingly, the replication process 34 in client system B 10 and the replication process 52 in mail server system 16 operate to move copies of the shared credential stores in the shared stores database 42 to their respective systems.

The client system 10, server system A 12, server system B 14 and mail server system 16 may each be embodied as computer systems having at least one processor and program storage memory and/or storage devices, and including one or more input/output (I/O) interfaces. The client system 10, server system A 12, server system B 14 and mail server system 16 may be communicably connected through any specific type of communications network, such as a local area network (LAN), a wide area network (WAN) such as the Internet, or any other appropriate communication network. Moreover, while the illustrative operational environment of FIG. 1 is shown for purposes of concise explanation as including encrypted three encrypted private network stores 38*a*, 38*b* and 38*c* on a single server system A 12, and one set of shared stores 42 on a single server system B 14, the disclosed system is not so limited. Accordingly, those skilled in the art will recognize that the disclosed system may aggregate access to any appropriate number of encrypted private network stores and/or shared stores, located on an appropriate number of servers systems. Similarly, while FIG. 1 shows a mail server system 16 including a user mail agent 44 using the personal credential store 48, this is just one example of a process acting on behalf of the user, and executing remotely from the user's client computer system. Accordingly, the disclosed system may be used by a specific type of remote process acting on behalf of the user, and requiring access to credential information stored in the shared credential stores provided in the shared stores 42. In addition, while one client system 10 is shown in FIG. 1, the encrypted private network stores 38*a*, 38*b* and 38*c* are accessible from any number of client systems that the user uses, based on the provision of the user's password, or some other authenticating information, to the replication and authentication process 36.

A network-resident shareable credential store, such as may be stored in the shared stores database 42 in server system B 14 of FIG. 1, may be used by software processes acting on behalf of the user of client system 10, but that do not know the user's password. Examples of such processes include scheduled agents or background tasks. A network-resident shareable credential store may also or alternatively be shared by multiple users. Examples of credentials that may be stored in a network-resident shareable credential stores include administrator-defined root certificates. The replication and access control process 40 may be used to store and use ACLs (Access Control Lists), or the equivalent, to control access by users to the shareable credential stores in the shared stores database 42.

A trust policy, implemented by the disclosed system, may be used to determine whether an open credential store is presented via the disclosed aggregated credential store API. For example, only credentials from trusted stores may be made available through the disclosed aggregate credential store API. In one embodiment, un-trusted credential stores may be opened, but their content is only made available if the store is explicitly addressed, and accordingly is invisible to most applications.

A system or network administrator's administration client software may interface through the API 22 to the personal credential store software 24, on the client system 10 or on some other client system. However, the aggregation of physical credential stores provided by the disclosed system is most useful to applications that use credentials by reading them, as opposed to modifying them. An administration software client needs to be able to add, update or modify credentials with knowledge of which physical credential store the credential is contained in, since the credential store determines the credential's visibility and/or accessibility on the network. Accordingly, the needs of an administration client may in some situations be best met through a separate administration interface to one of more of the physical credential stores. For example, in one embodiment of the disclosed system, a specialized certificate administration software tool, shown for purposes of illustration as the admin tool 43 in server system B 14, is operable to present a view of a shared, network-accessible credential store within the shared credential stores 42, that is used to store domain-wide trusted root certificates. In such an embodiment, this software tool communicates directly to the shared network store API 47, without needing to use the aggregated credential store API 22.

Figure 2:
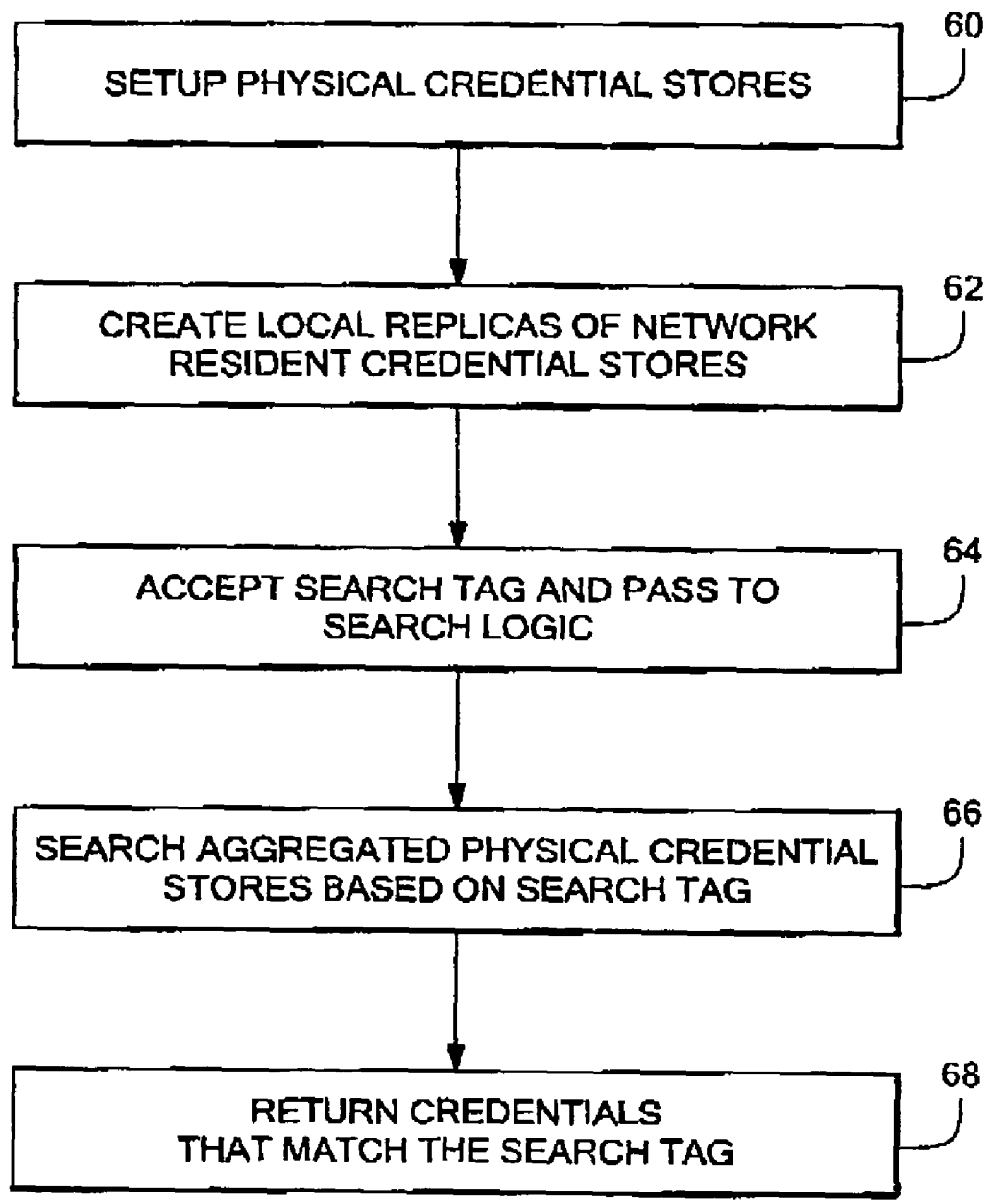
FIG. 2 is a flow chart illustrating steps performed with respect to the operation of an illustrative embodiment the disclosed shared credential store.

FIG. 2 is a flow chart illustrating steps performed by an embodiment of the disclosed system. At step 60, the physical stores that are aggregated under the disclosed API are set up and populated with credential data. Credential data may be dynamically added to the aggregated physical credential stores as needed. At step 62, the disclosed system may operate to create local replicas of one or more network resident credential stores on a client computer system. While in one embodiment, search operations are performed on these local replicas, the present invention is not so limited. Accordingly, the search operations performed under the aggregated credential store API may alternatively be performed on the network resident credential stores directly.

At step 64, the disclosed system accepts search tag information through the disclosed API, and passes the search tag information to search logic within the disclosed system. The received search tag information indicates to the search logic how the aggregated physical credential stores are to be searched. The received search tag includes, for example, a unique identifier indicating the functional purpose for which the requested credential is needed. For example, a search tag may indicate that a username and password is needed for generating an HTTP request. Additionally, in such a situation, the search tag may have associated with it, or include, a string indicating a domain name to which the HTTP request is being made. Using the search tag information received through the API, at step 66 the search logic locates credential information in the aggregated physical credential stores that meets the requirements indicated by the search tag. For example, at step 66 the search logic may search for a username and password that are relevant and understood by the application associated with the domain name provided in the search tag, where the search tag indicates that the requested credential is to be used for an HTTP request. In another example, an email application program may need to verify a digital signature for incoming email messages. In such a case, the credentials being searched for by the disclosed system in the aggregated credential stores would be digital certificates, and the tag values could be either email addresses (when searching for a sender's digital certificate directly), or public-key values (when looking for digital certificates for certificate authorities). At step 68, the disclosed system returns credentials from the aggregated physical credential stores that match the search tag information received at step 64.

The disclosed system may further be embodied or used so that the search tag processing logic enables logical linking of a user's private key and a digital certificate obtained from a certificate authority. As it is generally known, digital certificates are used with public key encryption systems, and are issued by trusted third parties known as "certificate authorities". The certificate authority verifies that a public key belongs to a user through a predetermined certification process. The certificate authority then provides the user with a digital certificate containing the user's public key, and that is digitally signed by the certificate authority. The digital certificate can then be included with a message that is digitally signed by the user, so that the recipient of the message can verify the identity of the user as a sender of the message. In the disclosed system, a user's digital certificate may be stored in the shared stores 42 of server system B shown in FIG. 1, while the private key associated with the public key in the digital certificate can be stored in the local credential store 26, or alternatively in one of the network resident private credential stores, shown for purposes of illustration as 38*a*. 38*b* and 38*c* in FIG. 1. Using these techniques or others, the disclosed system enables an administrator to centrally-manage portions of otherwise private credentials, such as the public-key certificates corresponding to user-held private keys.

For example, the disclosed system may be embodied to associate keypairs and digital certificates. As noted above, when digitally signing an outgoing message or decrypting a received message, both the private key and the corresponding certificate are required. A private key and a certificate may be stored as distinct credentials, so that the private key may be kept tightly-protected in a local store, while the certificate is stored in a network resident credential set so that it can conveniently be updated by an external certificate authority. The disclosed system may be embodied to provide a mechanism to locate the private key from the certificate, and/or locate the certificate from the private key. In the disclosed approach, both credential objects are constructed so that they are accessible based on a common value with a "Key-Identifier" search tag, where the associating value is a cryptographic hash of the public key. The public key is present in both the keypair credential object including the private key, and the certificate credential object. Hence, having obtained either credential, the other may be easily located via a search on this tag/value combination. Since this search uses the disclosed aggregating personal credential store API, it can locate the corresponding credential even if it is stored in a different physical credential store.

The disclosed system may further be embodied to include an optional credential migration mechanism. In an embodiment including such a credential migration mechanism, credentials may be placed in a shared credential store, and marked so that they will be copied into a different credential store. The credentials to be migrated may also be optionally marked to be merged with an existing credential in the other credential store. This optional mechanism could, for example, be used when an administrative process acquires a certificate on behalf of a user for a private key residing in a local or private credential store which cannot be directly written to without knowledge of the user's password.

During operation of the disclosed system, the optional credential migration mechanism may be coupled with replication of a network resident credential store onto a client system. Upon completion of a replication of the network resident credential store onto the client system, the new contents of the replicated store are examined by the personal credential store software on the client system, and those replicated credentials that are marked for migration are identified. For example, a migrating credential may be annotated with the name of the target store, and an identifier for a credential within the target store. If the specified target store is currently open, then the disclosed personal credential store software on the client system operates to complete the migration of the credential, merging the contents of the migrating credential into the existing credential in the target store.

FIG. 1 is a block diagram, and FIG. 2 is a flowchart illustration of methods, apparatus (systems) and computer program products according to an embodiment of the invention. It will be understood that each block of FIGS. 1 and 2, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the system may be embodied using a variety of specific command structures. Accordingly, the invention should not be viewed as limited except by the scope and spirit of the appended claims.

I claim:

1. A method of providing a personal credential store for a networked computer system user, comprising:
   accepting a plurality of search tags, through an application programming interface, wherein each of said plurality of search tags indicates a corresponding one of a plurality of application programs and a type of request to be performed with an obtained credential by said corresponding one of said plurality of application programs;
   searching a plurality of physical credential stores responsive to a received one of said plurality of search tags to obtain at least one credential from said plurality of physical credential stores, wherein said obtained credential meets requirements of one of said application programs indicated by said received one of said plurality of search tags to perform said type of request indicated by said received one of said plurality of search tags;
   wherein said one of said application programs indicated by said received one of said plurality of search tags is an electronic mail program;
   wherein said type of request to be performed indicated by said received one of said plurality of search tags is verification of an incoming electronic mail message;
   wherein said received one of said plurality of search tags has a value comprising an electronic mail address of a sender of said incoming electronic mail message; and
   wherein said verification of said incoming electronic mail message includes directly searching, responsive to said received one of said plurality of search tags having said value comprising said electronic mail address of said sender of said incoming electronic mail message, for a digital certificate of said sender of said incoming electronic mail message.

2. The method of providing a personal credential store of claim 1, wherein said plurality of physical credential stores comprises a local credential store for storing local credentials, wherein said local credential store is located on a first client computer system associated with said user, and wherein said local credential store is not accessible to systems other than said first client computer system.

3. The method of providing a personal credential store of claim 2, wherein said plurality of physical credential stores further comprises at least one network resident private credential store that is shared only across a plurality of client computer systems associated with said user, wherein said plurality of client computer systems includes said first client computer system, and wherein said at least one network resident private credential store is stored on at least one remote server computer system.

4. The method of claim 3, wherein said local credential store comprises a password-encrypted file, and wherein said local credential store cannot be accessed without a password associated with said user.

5. The method of claim 3, wherein said network resident private credential store comprises password-encrypted data, and wherein said password-encrypted data cannot be accessed without a password associated with said user.

6. The method of providing a personal credential store of claim 3, wherein said plurality of physical credential stores further comprises at least one network-resident shareable credential store that is accessible to at least one process acting on behalf of said user that does not know said user's password.

7. The method of providing a personal credential store of claim 3, wherein said plurality of physical credential stores further comprises at least one network resident shareable credential store that is accessible to multiple users including said user.

8. The method of providing a personal credential store of claim 7, wherein said at least one network resident shareable credential store is further accessible by an administration software tool through an application programming interface.

9. The method of providing a personal credential store of claim 7, wherein said network resident shareable credential store comprises a set of rows in a database stored on a remote server system.

10. The method of providing a personal credential store of claim 1, further comprising:
    copying a contents of at least one of said plurality of physical credential stores from a remote server system to a local copy on a client computer system.

11. The method of providing a personal credential store of claim 10, further comprising:
    detecting at least one credential marked for migration in said local copy, and copying said credential marked for migration from a first one of said plurality of physical credential stores to a second one of said plurality of physical credential stores.

12. The method of providing a personal credential store of claim 11, wherein said first one of said plurality of physical credential stores comprises a network resident shareable credential store that is accessible to multiple users, and wherein said second one of said plurality of physical credential stores comprises a private credential store only accessible to a user of said client computer system.

13. The method of providing a personal credential store of claim 11, further comprising detecting that said credential marked for migration in said local copy is further marked for merging with another credential in said second one of said plurality of physical credential stores, and combining said credential marked for migration into said credential in said second one of said plurality of physical credential stores.

14. The method of claim 1, further comprising:
wherein at least some of said plurality of search tags of credentials obtained from said credential stores may be examined by said application programs regardless of whether said search tags were used in searching to obtain said credentials.

15. The method of claim 8, further comprising:
wherein said administration software tool enables an administrator user to manage portions of otherwise private credentials in said at least one network resident shareable credential store.

16. The method of claim 15, wherein said portions of said otherwise private credentials comprise a set of administrator defined root certificates.

17. The method of claim 15, further comprising:
wherein said portions of said otherwise private credentials include a public key of said networked computer system user; and
storing a private key associated with said public key in said local credential store.

18. A method of providing a personal credential store for a networked computer system user, comprising:
accepting a plurality of search tags, through an application programming interface, wherein each of said plurality of search tags indicates a corresponding one of a plurality of application programs and a type of request to be performed with an obtained credential by said corresponding one of said plurality of application programs;
searching a plurality of physical credential stores responsive to a received one of said plurality of search tags to obtain at least one credential from said plurality of physical credential stores, wherein said obtained credential meets requirements of one of said application programs indicated by said received one of said plurality of search tags to perform said type of request indicated by said received one of said plurality of search tags;
wherein said received one of said plurality of search tags indicates a domain name;
wherein said one of said application programs indicated by said received one of said plurality of search tags is associated with said domain name;
wherein said type of request to be performed indicated by said received one of said plurality of search tags is a HyperText Transfer Protocol (HTTP) request; and
wherein said received one of said plurality of search tags indicates that said HTTP request requires said at least one obtained credential;
wherein said plurality of physical credential stores comprises a local credential store for storing local credentials, wherein said local credential store is located on a first client computer system associated with said user, and wherein said local credential store is not accessible to systems other than said first client computer system; and
wherein said plurality of physical credential stores further comprises at least one network resident private credential store that is shared only across a plurality of client computer systems associated with said user, wherein said plurality of client computer systems includes said first client computer system, and wherein said at least one network resident private credential store is stored on at least one remote server computer system.

19. A computer-implemented method of providing a personal credential store for a networked computer system user, comprising:
generating, by at least one computer system, an application programming interface to a plurality of physical credential stores, said plurality of physical credential stores including
a private credential store accessible only to said user, and
a network-resident shareable credential store accessible to at least one process acting on behalf of said user that does not know said user's password;
wherein a keypair credential associated with said user is stored in said private credential store, said keypair credential including a public key and a private key;
wherein a digital certificate associated with said user is stored in said network resident shareable credential store, said digital certificate issued by a certificate authority and containing said public key;
wherein said keypair credential stored in said private credential store and said digital certificate stored in said network resident shareable credential store are both accessible through said application programming interface responsive to a single predetermined search tag and a predetermined value; and
wherein said predetermined value comprises a cryptographic hash of said public key.

20. The method of claim 19, wherein said private credential store comprises a local credential store for storing local credentials, wherein said local credential store is located on a first client computer system associated with said user, and wherein said local credential store is not accessible to systems other than said first client computer system.

21. The method of claim 19, wherein said private credential store comprises at least one network resident private credential store that is shared only across a plurality of client computer systems associated with said user, wherein said plurality of client computer systems includes said first client computer system, and wherein said at least one network resident private credential store is stored on at least one remote server computer system.

22. A system, comprising:
at least one processor and a non-signal computer readable storage medium, said computer readable storage medium having program code stored thereon for providing a personal credential store for a networked computer system user, said program code comprising
program code for generating an application programming interface to a plurality of physical credential stores, said plurality of physical credential stores including
a private credential store accessible only to said user, and
a network-resident shareable credential store accessible to at least one process acting on behalf of said user that does not know said user's password;
wherein a keypair credential associated with said user is stored in said private credential store, said keypair credential including a public key and a private key;
wherein a digital certificate associated with said user is stored in said network resident shareable credential store, said digital certificate issued by a certificate authority and containing said public key;

wherein said keypair credential stored in said private credential store and said digital certificate stored in said network resident shareable credential store are both accessible through said application programming interface responsive to a single predetermined search tag and a predetermined value; and wherein said predetermined value comprises a cryptographic hash of said public key.

23. The system of claim 22, wherein said private credential store comprises a local credential store for storing local credentials, wherein said local credential store is located on a first client computer system associated with said user, and wherein said local credential store is not accessible to systems other than said first client computer system.

24. The system of claim 22, wherein said private credential store comprises at least one network resident private credential store that is shared only across a plurality of client computer systems associated with said user, wherein said plurality of client computer systems includes said first client computer system, and wherein said at least one network resident private credential store is stored on at least one remote server computer system.

25. The system of claim 22, wherein said predetermined value comprises a cryptographic hash of said public key.

26. A computer program product, comprising:

at least one non-signal computer readable storage medium, said computer readable storage medium having program code stored thereon for providing a personal credential store for a networked computer system user, said program code comprising program code for generating an application programming interface to a plurality of physical credential stores, said plurality of physical credential stores including a private credential store accessible only to said user, and a network-resident shareable credential store accessible to at least one process acting on behalf of said user that does not know said user's password;

wherein a keypair credential associated with said user is stored in said private credential store, said keypair credential including a public key and a private key;

wherein a digital certificate associated with said user is stored in said network resident shareable credential store, said digital certificate issued by a certificate authority and containing said public key;

wherein said keypair credential stored in said private credential store and said digital certificate stored in said network resident shareable credential store are both accessible through said application programming interface responsive to a single predetermined search tag and a predetermined value; and wherein said predetermined value comprises a cryptographic hash of said public key.

* * * * *